United States Patent
Murakami et al.

(10) Patent No.: US 9,672,944 B2
(45) Date of Patent: Jun. 6, 2017

(54) METHOD OF DETERMINING NUCLEAR FUSION IRRADIATION COORDINATES, DEVICE FOR DETERMINING NUCLEAR FUSION IRRADIATION COORDINATES, AND NUCLEAR FUSION DEVICE

(71) Applicants: OSAKA UNIVERSITY, Suita-shi, Osaka (JP); HAMAMATSU PHOTONICS K.K., Hamamatsu-shi (JP)

(72) Inventors: Masakatsu Murakami, Suita (JP); Nobuhiko Sarukura, Suita (JP); Hiroshi Azechi, Suita (JP); Ryo Yasuhara, Hamamatsu (JP); Toshiyuki Kawashima, Hamamatsu (JP); Hirofumi Kan, Hamamatsu (JP)

(73) Assignees: OSAKA UNIVERSITY, Suita-shi, Osaka (JP); HAMAMATSU PHOTONICS K.K., Hamamatsu-shi, Shizuoka (JP)

(*) Notice: Subject to any disclaimer, the term of this patent is extended or adjusted under 35 U.S.C. 154(b) by 32 days.

(21) Appl. No.: 14/948,495

(22) Filed: Nov. 23, 2015

(65) Prior Publication Data

US 2016/0104547 A1 Apr. 14, 2016

Related U.S. Application Data

(62) Division of application No. 13/388,500, filed as application No. PCT/JP2010/062178 on Jul. 20, 2010, now Pat. No. 9,230,694.

(30) Foreign Application Priority Data

Aug. 6, 2009 (JP) ................................. 2009-183670

(51) Int. Cl.
*H05H 1/22* (2006.01)
*G21B 1/23* (2006.01)

(52) U.S. Cl.
CPC ................. *G21B 1/23* (2013.01); *H05H 1/22* (2013.01)

(58) Field of Classification Search
CPC ..... G21D 3/00; G21D 3/001; G21D 2003/002; G21D 2003/004; G21D 2003/005;
(Continued)

(56) References Cited

U.S. PATENT DOCUMENTS 4,234,925 A * 11/1980 Kitano ..................... G21B 1/00
376/143
4,608,222 A 8/1986 Brueckner
(Continued)

FOREIGN PATENT DOCUMENTS

CN 1075026 8/1993
CN 1309398 8/2001
(Continued)

OTHER PUBLICATIONS

"Laboratory for Laser Energetics, OMEGA 60" Internet URL: http://www.lle.rochester.edu/05_omegalaserfacility/05_omegalaserfacility.php, updated Jun. 2009.
(Continued)

*Primary Examiner* — Marshall O'Connor
(74) *Attorney, Agent, or Firm* — Drinker Biddle & Reath LLP

(57) ABSTRACT

An object of the present invention is to efficiently improve uniformity of energy lines to be irradiated. A method of determining nuclear fusion irradiation coordinates according to the present invention is a method of calculating irradiation coordinates when energy lines are irradiated onto a nuclear fusion target, and comprises an initial arrangement step $S202$ of virtually arranging electric charges $Q_i$ at initial coordinates of the number of irradiation coordinates $N_B$ on a spherical surface $S_0$ set by using random numbers, a coordinate analysis step $S203$ of analyzing coordinates $r_i$ of the electric charges $Q_i$ in time series based on coulomb forces acting among the electric charges $Q_i$ by constraining the coordinates $r_i$ onto the spherical surface $S_0$, potential
(Continued)

evaluation steps S205 and S206 of determining a timing at which potential energies of the electric charges $Q_i$ were stabilized based on the coordinates $r_i$, and an irradiation coordinate deriving step S207 of deriving coordinates $r_i$ at the timing at which potential energies were stabilized as irradiation coordinates of energy lines in a case where a nuclear fusion target is arranged at the center of the spherical surface $S_0$.

2 Claims, 8 Drawing Sheets

(58) Field of Classification Search
CPC ... G06G 7/48; G06G 7/54; G21B 1/00; G21B 1/11; G21B 1/21; G21B 1/25
See application file for complete search history.

(56) References Cited

U.S. PATENT DOCUMENTS 5,307,385 A * 4/1994 Shimanuki ............ G01N 17/00
376/245

2005/0129159 A1 * 6/2005 Laor ..................... G21B 1/00
376/100

FOREIGN PATENT DOCUMENTS

CN 101364450 2/2009
JP S63-121782 5/1998

OTHER PUBLICATIONS

Masakatsu Murakami, "Design of a conic irradiation system for laser fusion," Fusion Engineering and Design, 1999, vol. 44, pp. 111-115.

Kentarou Miyazawa et al, "Heavy Ion Beam Illumination Nonuniformity in Inertial Confinement Fusion," The Institute of Electrical Engineers of Japan Plasma Science and Technology Kenkyukai Shiryo, PST-06, 1-18, The Institute of Electrical Engineers of Japan, 2006, pp. 11-16 [with English language Abstract].

S.G. Garanin et al., "Formation of the uniform irradiation of a target in high-power laser facilities," Quantum Electronics, 2004, vol. 34, No. 5, pp. 427-446.

* cited by examiner

METHOD OF DETERMINING NUCLEAR FUSION IRRADIATION COORDINATES, DEVICE FOR DETERMINING NUCLEAR FUSION IRRADIATION COORDINATES, AND NUCLEAR FUSION DEVICE

CROSS-REFERENCE TO PRIOR APPLICATION

This is a continuation application of U.S. patent application Ser. No. 13/388,500, filed on Mar. 2, 2012, now U.S. Pat. No. 9,230,694, issued Jan. 5, 2016, which is a national stage application of PCT Application No. PCT/JP2010/062178 filed on Jul. 20, 2010, which claims priority to Japanese Patent Application No. 2009-183670 filed on Aug. 6, 2009, the entire contents of each of which are incorporated by reference herein in their entirety.

TECHNICAL FIELD

The present invention relates to a method of determining nuclear fusion irradiation coordinates and a device for determining nuclear fusion irradiation coordinates by which irradiation coordinates of energy lines onto nuclear fusion fuel are determined, and a nuclear fusion device using the method and device.

BACKGROUND ART

Nuclear fusion is expected to become a future energy source as an alternative to fossil fuel, etc. In particular, in the field of laser fusion that is a system of inertial confinement fusion, since a fast ignition system using peta watt (PW) laser light with ultrahigh power was proposed in the early 1990s, it has been energetically developed by various research institutes, and the fundamental study thereof is being rapidly developed.

In laser fusion using direct irradiation represented by a fast ignition system and a central ignition system, by irradiating laser light onto a nuclear fusion target (pellet), fuel is compressed (imploded) to the central portion of the target, and an ultrahigh-density state is created. At this time, for stably causing inertial confinement fusion, high-density compression of fuel is essential, and for this, the nuclear fusion target must be irradiated and compressed as uniformly as possible. For example, a conventional configuration for obtaining uniform irradiation of laser light, a nuclear fusion device in which irradiation coordinates of 60 laser lights are set to be spherically symmetrical is known (refer to Non-Patent Literature 1 listed below).

CITATION LIST

Non Patent Literature

[Non-Patent Literature 1] "Laboratory for Laser Energetics, OMEGA 60," [online], updated in June 2009, [searched for on Jul. 23, 2009], on the Internet <URL: http://www.lle.rochester.edu/05_omegalaserfacility/05_omegalaserfacility.php>

SUMMARY OF INVENTION

Technical Problem

However, in the above-described device, uniformity of laser light irradiation is still insufficient for causing inertial confinement fusion.

Therefore, the present invention was made in view of this problem, and an object thereof is to provide a method of determining nuclear fusion irradiation coordinates, a device for determining nuclear fusion irradiation coordinates, and a nuclear fusion device that efficiently improves the uniformity of energy lines to be irradiated.

Solution to Problem

In order to solve the above-described problem, a method of determining nuclear fusion irradiation coordinates according to the present invention is a method of calculating irradiation coordinates of energy lines when the energy lines are irradiated onto nuclear fusion fuel, comprising: an initial arrangement step of virtually arranging a predetermined number of electric charges on a predetermined number of initial coordinates on a spherical surface set by using random numbers; a coordinate analysis step of analyzing coordinates of the predetermined number of electric charges arranged at initial coordinates in time series by an information processing device based on coulomb forces acting among the predetermined number of electric charges by constraining the coordinates onto the spherical surface; a potential evaluation step of determining a timing at which potential energies of the predetermined number of electric charges were stabilized based on the coordinates analyzed in the coordinate analysis step; and an irradiation coordinate deriving step of deriving coordinates of the predetermined number of electric charges at the timing determined by the potential evaluation step as irradiation coordinates of energy lines in a case where nuclear fusion fuel is arranged at the center of the spherical surface.

Alternatively, a device for determining nuclear fusion irradiation coordinates according to the present invention is an information processing device that calculates irradiation coordinates of energy lines when the energy lines are irradiated onto nuclear fusion fuel, comprising: an initial arrangement means for virtually arranging a predetermined number of electric charges at a predetermined number of initial coordinates on a spherical surface set by using random numbers; a coordinate analysis means for analyzing the coordinates of the predetermined number of electric charges arranged at the initial coordinates in time series based on coulomb forces acting among the predetermined number of electric charges by constraining the coordinates onto the spherical surface; a potential evaluation means for determining a timing at which potential energies of the predetermined number of electric charges were stabilized based on the coordinates analyzed by the coordinate analysis means, and an irradiation coordinate deriving means for deriving coordinates of the predetermined number of electric charges at the timing determined by the potential evaluation means as irradiation coordinates of energy lines in a case where nuclear fusion fuel is arranged at the center of the spherical surface.

With such a method of determining nuclear fusion irradiation coordinates and a device for determining nuclear fusion irradiation coordinates, electric charges are virtually arranged at a predetermined number of initial coordinates on a spherical surface by an information processing device, the coordinates of the electric charges are analyzed in time series, and based on coordinates at a timing at which potential energies of the electric charges were stabilized, irradiation coordinates of energy lines when nuclear fusion fuel is arranged at the central portion of the spherical surface are derived. Accordingly, with a smaller number of coordinates of energy lines as compared with the conventional case, uniformity in irradiation intensity of energy lines on the nuclear fusion fuel is improved.

Further, a nuclear fusion device according to the present invention is manufactured by using the above-described method of determining nuclear fusion irradiation coordinates, and includes a nuclear fusion target for igniting a nuclear fusion reaction by irradiating energy lines, and a predetermined number of energy line sources provided at positions corresponding to irradiation coordinates calculated by the method of determining nuclear fusion irradiation coordinates when the nuclear fusion target is arranged at the center of a spherical surface.

With this nuclear fusion device, uniformity in irradiation intensity of energy lines onto nuclear fusion fuel is improved, so that inertial confinement fusion can be stably caused.

Advantageous Effects of Invention

According to the present invention, uniformity of energy lines to be irradiated can be efficiently improved.

DESCRIPTION OF EMBODIMENTS

Hereinafter, a preferred embodiment of a method of determining nuclear fusion irradiation coordinates and a device for determining nuclear fusion irradiation coordinates according to the present invention will be described in detail with reference to the drawings. In the description of the drawings, portions identical to or equivalent to each other are designated by the same reference signs, and overlapping description will be omitted.

Figure 8A:
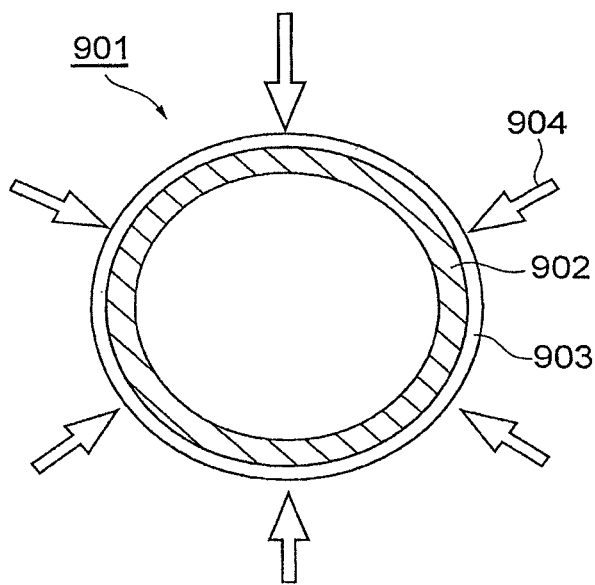
FIG. 8A is a view showing a principle of a central ignition system as a system of inertial confinement fusion.

First, a principle of inertial confinement fusion in a nuclear fusion device to which a method of determining nuclear fusion irradiation coordinates is applied is described with reference to FIGS. 8A and 8B. FIG. 8A is a view showing a principle of a central ignition system as a system of inertial confinement fusion, and FIG. 8B is a view showing a principle of a fast ignition system as another system of inertial confinement fusion.

In the central ignition system, as shown in FIG. 8A, as a nuclear fusion target (pellet) for igniting a nuclear fusion reaction, a spherical target 901 consisting of a DT fuel layer 902 and an ablator layer 903 is used. By irradiating laser light 904 onto this target 901, the spherical fuel layer 902 is compressed spherically symmetrically. Then, by compressing comparatively low-density and high-temperature plasmas formed in the central portion by peripheral low-temperature and high-density plasmas at a final stage, a hot spot for ignition of a nuclear fusion reaction is produced at the central portion.

Figure 8B:
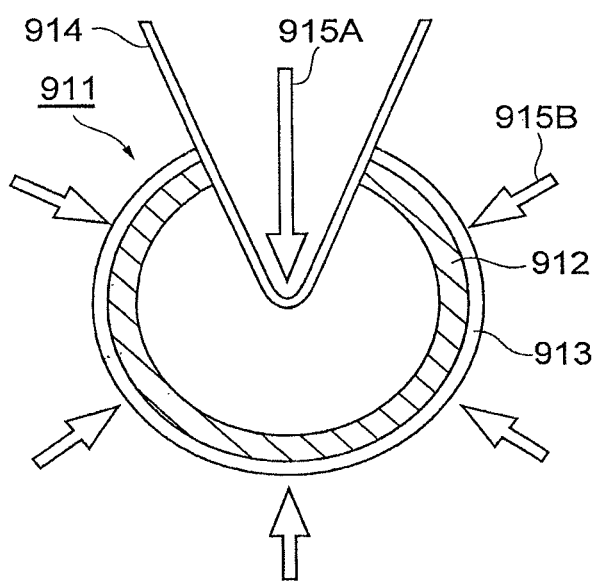
FIG. 8B is a view showing a principle of a fast ignition system as another system of inertial confinement fusion.

In the fast ignition system, as shown in FIG. 8B, a target 911 consisting of a DT fuel layer 912, an ablator layer 913, and a cone 914 is used. In this system, the fuel layer 912 is compressed to the central portion by irradiating laser light 915B onto the fuel portion of the target 911. Further, by irradiating peta watt laser light 915A from the cone 914 side, high-energy electrons are produced at the tip end portion of the cone 914. The high-energy electrons are transmitted and transported through the cone 914 made of a metal thin film of gold, etc., and finally heats the fuel compressed to a high density, and accordingly, a hot spot for ignition of a nuclear fusion reaction is produced.

For realizing these ignition systems, a high compression density of fuel is required, and as a result, high implosion uniformity and laser light irradiation uniformity are demanded. The method of determining nuclear fusion irradiation coordinates and the device for determining nuclear fusion irradiation coordinates according to the present invention are for designing irradiation coordinates of energy lines in a nuclear fusion device to meet the described demand. Here, as energy lines to be irradiated for nuclear fusion ignition, laser light is used, and a D (deuterium)-T (tritiated hydrogen) reaction is assumed as a nuclear fusion reaction, and DT fuel is assumed as corresponding nuclear fusion fuel, however, the present invention is also applicable to other energy lines, nuclear fusion reactions, and fuels.

Figure 1:
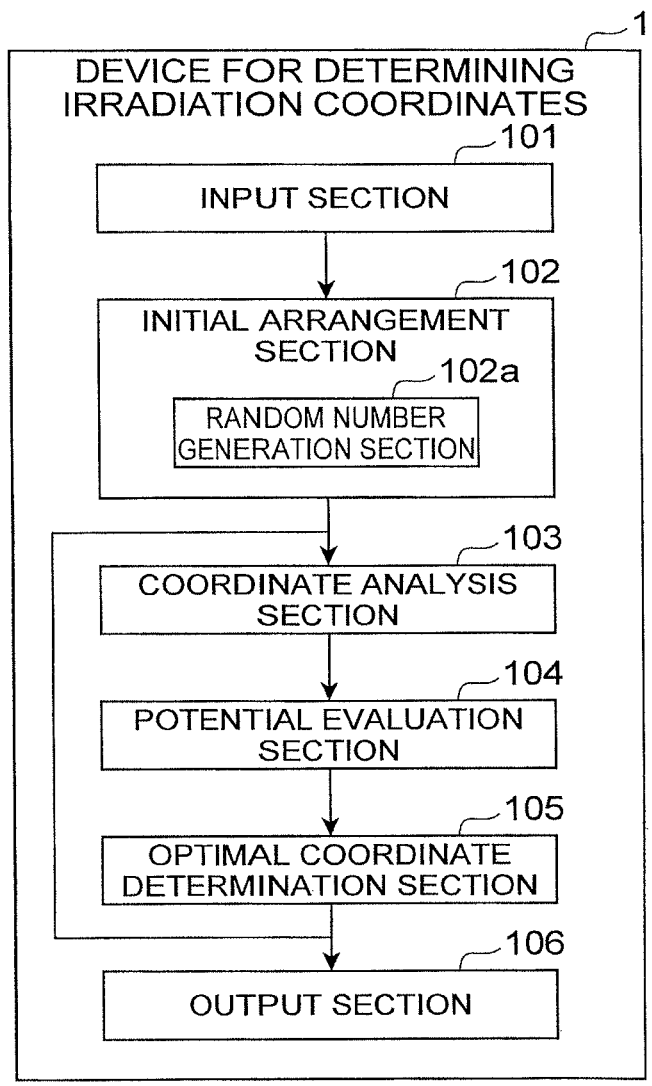
FIG. 1 is a block diagram showing a functional configuration of a device for determining irradiation coordinates according to a preferred embodiment of the present invention.
Figure 2:
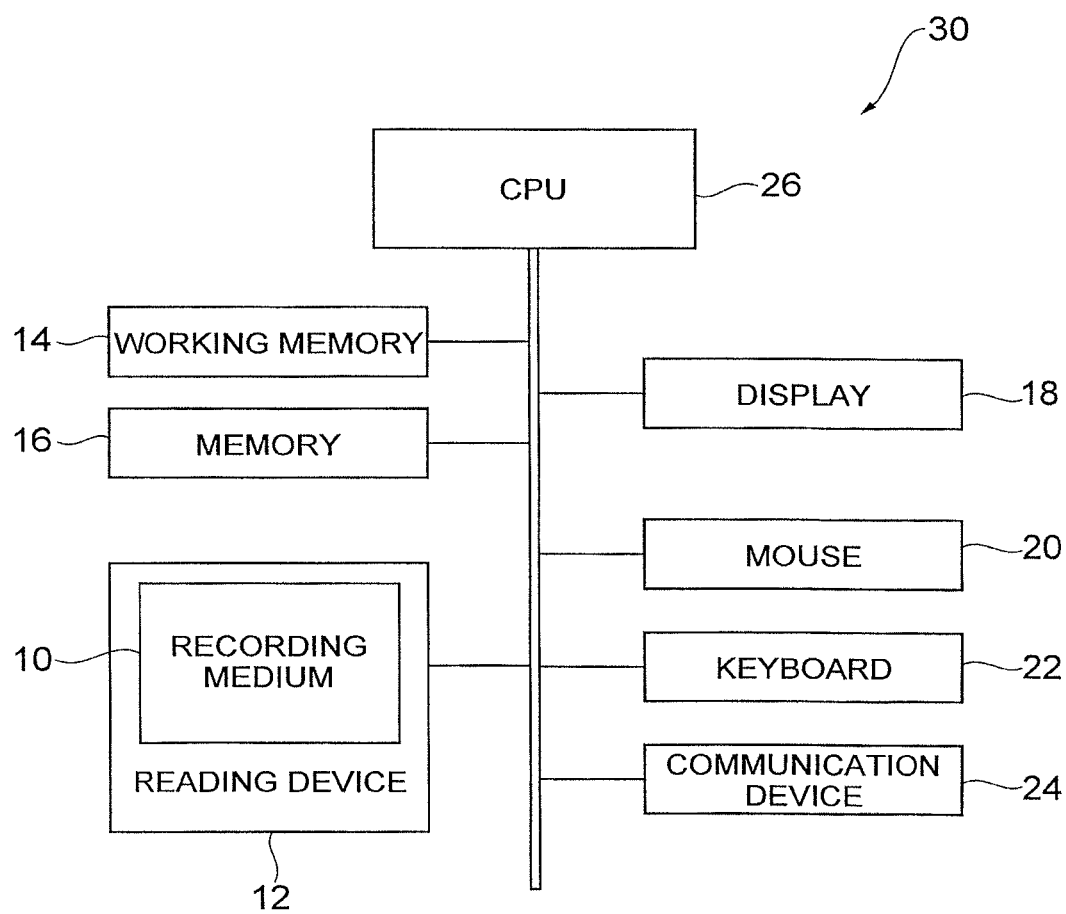
FIG. 2 is a hardware block diagram showing a hardware configuration of the device for determining irradiation coordinates shown in FIG. 1.
Figure 3:
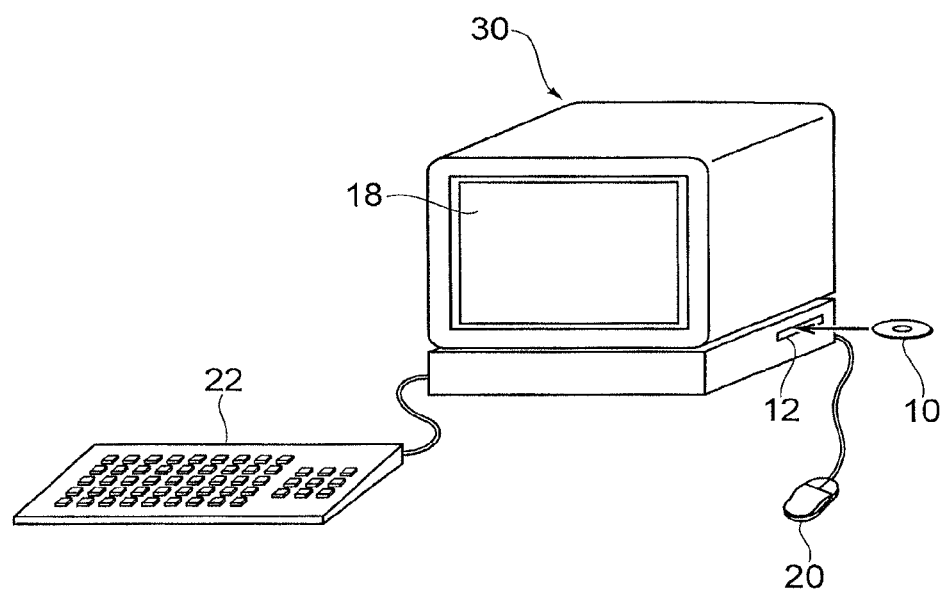
FIG. 3 is a perspective view of an information processing device that operates as the device for determining irradiation coordinates shown in FIG. 1.

FIG. 1 is a block diagram showing a functional configuration of a device 1 for determining irradiation coordinates according to a preferred embodiment of the present invention, FIG. 2 is a hardware block diagram showing hardware configuration of the device 1 for determining irradiation coordinates, and FIG. 3 is a perspective view of an information processing device that operates as the device 1 for determining irradiation coordinates.

As shown in FIG. 1, the device 1 for determining irradiation coordinates functionally includes an input section 101, an initial arrangement section (initial arrangement means) 102, a coordinate analysis section (coordinate analysis means) 103, a potential evaluation section (potential evaluation means) 104, an optimal coordinate determination section (irradiation coordinate deriving means) 105, and an output section 106. The information processing device 30 shown in FIG. 2 and FIG. 3 operates as this device 1 for determining irradiation coordinates.

The information processing device 30 includes a reading device 12 such as a floppy disk drive unit, a CD-ROM drive unit, and a DVD drive unit, a working memory (RAM) 14 in which an operating system is resident, a memory 16 that stores programs stored in a recording medium 10, a display unit 18 such as a display, a mouse 20 and a keyboard 22 as input devices, a communication device 24 for transmitting and receiving data, etc., and a CPU 26 for controlling executions of the programs. The information processing device 30 becomes accessible to a program stored in the recording medium 10 from the reading device 12 when the recording medium 10 is inserted into the reading device 12, and is allowed to operate as the device 1 for determining irradiation coordinates according to the present invention by this program.

In detail, the functions realized by the respective sections shown in FIG. 1 are realized by operating the communication device 24, the mouse 20, the keyboard 22, and the display 18 under control of the CPU 26 by reading a predetermined program on the hardware of the CPU 26 and the memory 16, etc., shown in FIG. 2, and reading and writing data from and on the working memory 14 and the memory 16.

Hereinafter, functions of the respective sections of the device 1 for determining irradiation coordinates are described in detail.

The input section 101 accepts an input of the number of irradiation coordinates of energy lines in a nuclear fusion device to be designed. Specifically, the input section 101 accepts an input of information on the number of irradiation coordinates using the mouse 20 and the keyboard 22, and stores the accepted data on the number of irradiation coordinates in the working memory 14, etc.

The initial arrangement section 102 sets initial coordinates $r0_i$ (i=1, ..., $N_B$) of electric charges $Q_i$ (i=1, ..., $N_B$) as many as the number of irradiation coordinates $N_B$ based on the number of irradiation coordinates $N_B$ ($N_B$ is a positive integer) accepted by the input section 101. In detail, the initial arrangement section 102 includes a random number generation section 102a, and sets a spherical surface $S_0$ centered on an origin O in a virtual space, and sets the initial coordinates $r0_i$ (i=1, ..., $N_B$) at random positions on the spherical surface $S_0$ while referring to random numbers generated by the random number generation section 102a. Accordingly, the initial arrangement section 102 virtually arranges $N_B$ electric charges $Q_i$ at the positions represented by $r0_i$ on the spherical surface $S_0$.

The coordinate analysis section 103 analyzes coordinates of $N_B$ electric charges $Q_i$ whose initial coordinates $r0_i$ were set by the initial arrangement section 102 in time series. Specifically, the coordinate analysis section 103 calculates coulomb forces acting among the electric charges $Q_i$ when the charge amount of the electric charges $Q_i$ (i=1, ..., $N_B$) is set to q. Further, the coordinate analysis section 103 adds a condition that the electric charges $Q_i$ are constrained onto the spherical surface $S_0$ ($|r_i|=1$, i=1, ..., $N_B$) and temporally integrates $N_B$ systems of equations of motions relating to the coordinates $r_i$ (i=1, ..., $N_B$) of the electric charges Q by using the following equation (1):

[Numerical equation 1]

$$\frac{d^2 r_j}{dt^2} = \sum_{i=1}^{N_B} \frac{q^2}{|\vec{r}_i - \vec{r}_j|^2} - Co \frac{d\vec{r}_j}{dt} (j = 1, \ldots, N_B) \quad (1)$$

to calculate all coordinates $r_i$ in time series. Here, the second term of the right side of the equation (1) is an artificial viscosity term for preventing micro-vibration of the solution.

The potential evaluation section 104 determines a timing at which the potential energies of all electric charges $Q_i$ were stabilized based on the coordinates $r_i$ of the $N_B$ electric charges $Q_i$ analyzed by the coordinate analysis section 103. In detail, each time the coordinates $r_i$ are calculated by the coordinate analysis section 103, the potential evaluation section 104 calculates the sum $E_P$ of potential energies of the $N_B$ electric charges $Q_i$ according to the following equation (2):

[Numerical equation 2]

$$E_P = \sum_{i=1}^{N_B} \sum_{j=1 (i \neq j)}^{N_B} \frac{q^2}{|\vec{r}_i - \vec{r}_j|} \quad (2)$$

Then, the potential evaluation section 104 determines whether the potential energies of the electric charges $Q_i$ have been stabilized by determining whether a temporal change of the sum $E_P$ is not more than a predetermined threshold $Th_P$. For example, it is determined whether a difference between a sum $E_P$ based on the coordinates $r_i$ previously calculated and a sum $E_P$ based on coordinates $r_i$ calculated at this time is not more than the threshold $Th_P = 10^{-16}$.

When the potential evaluation section 104 determines that the potential energies have been stabilized, the optimal coordinate determination section 105 identifies coordinates $r_i$ of the $N_B$ electric charges $Q_i$ at the stabilization timing. Then, the optimal coordinate determination section 105 derives these coordinates $r_i$ as coordinates corresponding to optimal irradiation coordinates of energy lines when the nuclear fusion target is arranged at the center of the spherical surface $S_0$. Then, the optimal coordinate determination section 105 transmits the derived coordinates $r_i$ to the output section 106, and the output section 106 outputs the coordinates in a predetermined output format such as a table data format, etc., to the display 18 and the communication device 24.

Figure 4:
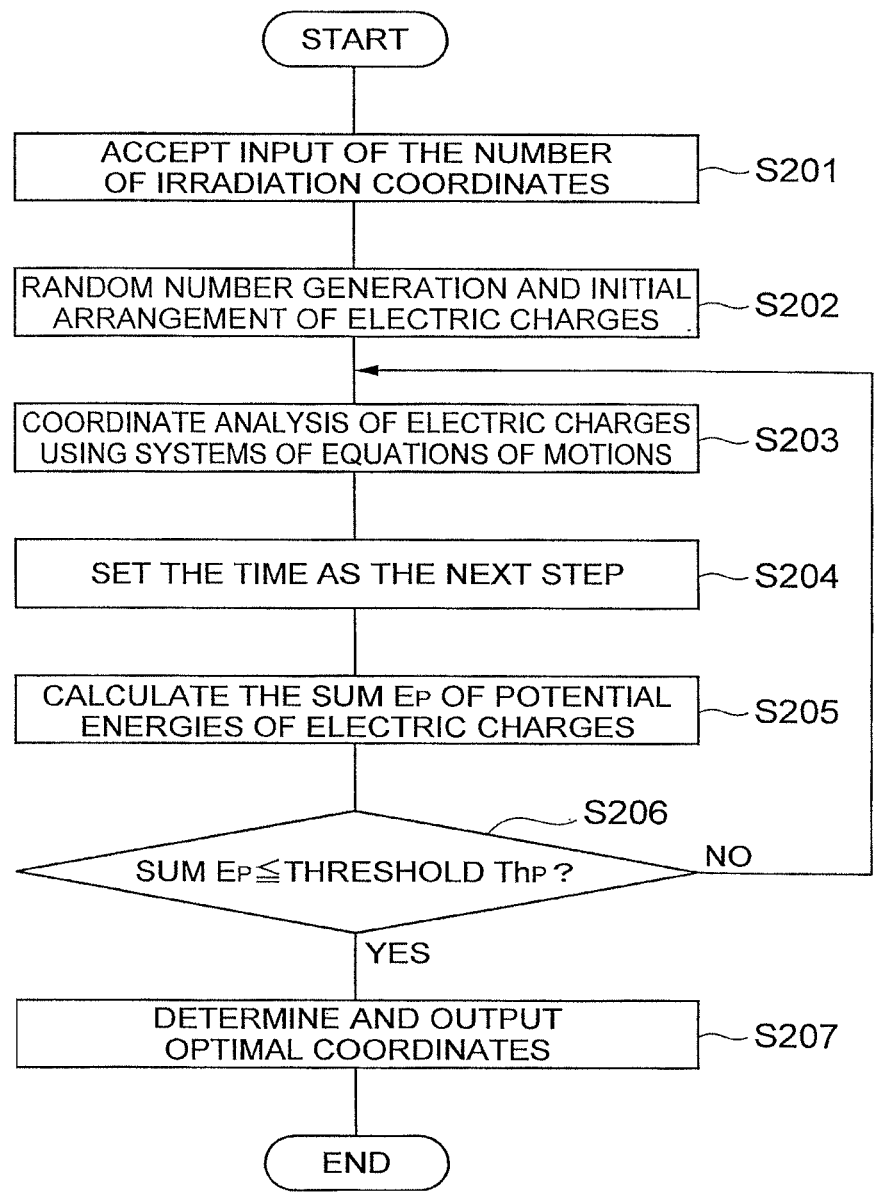
FIG. 4 is a flowchart showing steps of processing of determining irradiation coordinates by the device for determining irradiation coordinates shown in FIG. 1.

Next, a method of determining irradiation coordinates using the device 1 for determining irradiation coordinates is described with reference to FIG. 4. FIG. 4 is a flowchart showing steps of processing of determining irradiation coordinates by the device 1 for determining irradiation coordinates.

First, the input section 101 of the device 1 for determining irradiation coordinates accepts an input of the number of irradiation coordinates $N_B$ of energy lines relating to the nuclear fusion device to be designed (Step S201). Next, the initial arrangement section 102 randomly sets initial coordinates $r0_i$ of the electric charges $Q_i$ (i=1, ..., $N_B$) as many as the number of irradiation coordinates $N_B$ on the spherical surface $S_0$ by generating random numbers (Step S202).

Thereafter, the coordinate analysis section 103 calculates coordinates $r_i$ of the electric charges $Q_i$ in time series by temporally integrating N systems of equations of motions in consideration of coulomb forces between the electric charges $Q_i$ (i=1, ..., $N_B$) (Step S203). Then, the coordinate analysis section 103 sets the time of coordinates $r_i$ to be calculated next as the time of the next step (Step S204).

Further, the potential evaluation section 104 determines whether a temporal change of the sum $E_P$ of potential energies of all electric charges $Q_i$ is not more than the threshold $Th_P$, and transmits the determination result to the optimal coordinate determination section 105 (Step S206).

As a result, when a temporal change of the sum $E_P$ is not more than the threshold $Th_P$ (Step S206: YES), the optimal coordinate determination section 105 determines $N_B$ coordinates $r_i$ calculated at this timing as coordinates corresponding to the optimal irradiation coordinates of energy lines when the nuclear fusion target is arranged at the center of the spherical surface $S_0$. At the same time, the output section 106 outputs information on the optimal irradiation coordinates to the display 18, etc., and the process is ended (Step S207).

On the other hand, when a temporal change of the sum $E_P$ is more than the threshold $Th_P$ (Step S206: NO), the process is returned to Step S203 and the calculation of coordinates $r_i$ of the electric charges $Q_i$ relating to the time of the next step is repeated.

Next, an example of a nuclear fusion device designed and manufactured by using the above-described method of determining irradiation coordinates is described.

First, the optimal irradiation coordinates of energy lines derived by the device 1 for determining irradiation coordinates when the number of irradiation coordinates $N_B=4$ is set are as shown in the following Table 1.

TABLE 1

| Pattern A | | Pattern B | |
|---|---|---|---|
| θ [°] | φ [°] | θ [°] | φ [°] |
| 83.353 | 151.59 | 43.643 | 286.3 |
| 21.243 | 150 | 51.307 | 63.369 |
| 96.647 | 291.14 | 72.996 | 180.54 |
| 96.647 | 111.14 | 43.643 | 16.296 |
| 83.353 | 331.59 | 128.69 | 109.36 |
| 96.647 | 21.143 | 128.69 | 289.36 |
| 69.92 | 124.29 | 107 | 172.19 |
| 110.08 | 48.444 | 72.996 | 270.54 |
| 83.353 | 241.59 | 136.36 | 66.435 |
| 158.76 | 112.74 | 136.36 | 246.43 |
| 158.76 | 202.74 | 72.996 | 0.54248 |
| 158.76 | 22.735 | 136.36 | 156.43 |
| 83.353 | 61.588 | 128.69 | 199.36 |
| 69.92 | 34.286 | 51.307 | 153.37 |
| 158.76 | 292.74 | 128.69 | 19.361 |
| 21.243 | 59.996 | 51.307 | 333.37 |
| 21.243 | 240 | 136.36 | 336.43 |
| 110.08 | 138.44 | 107 | 262.19 |
| 110.08 | 228.44 | 107 | 82.188 |
| 110.08 | 318.44 | 43.643 | 196.3 |
| 96.647 | 201.14 | 107 | 352.19 |
| 69.92 | 304.29 | 43.643 | 106.3 |
| 69.92 | 214.29 | 72.996 | 90.542 |
| 21.243 | 330 | 51.307 | 243.37 |

Figure 5:
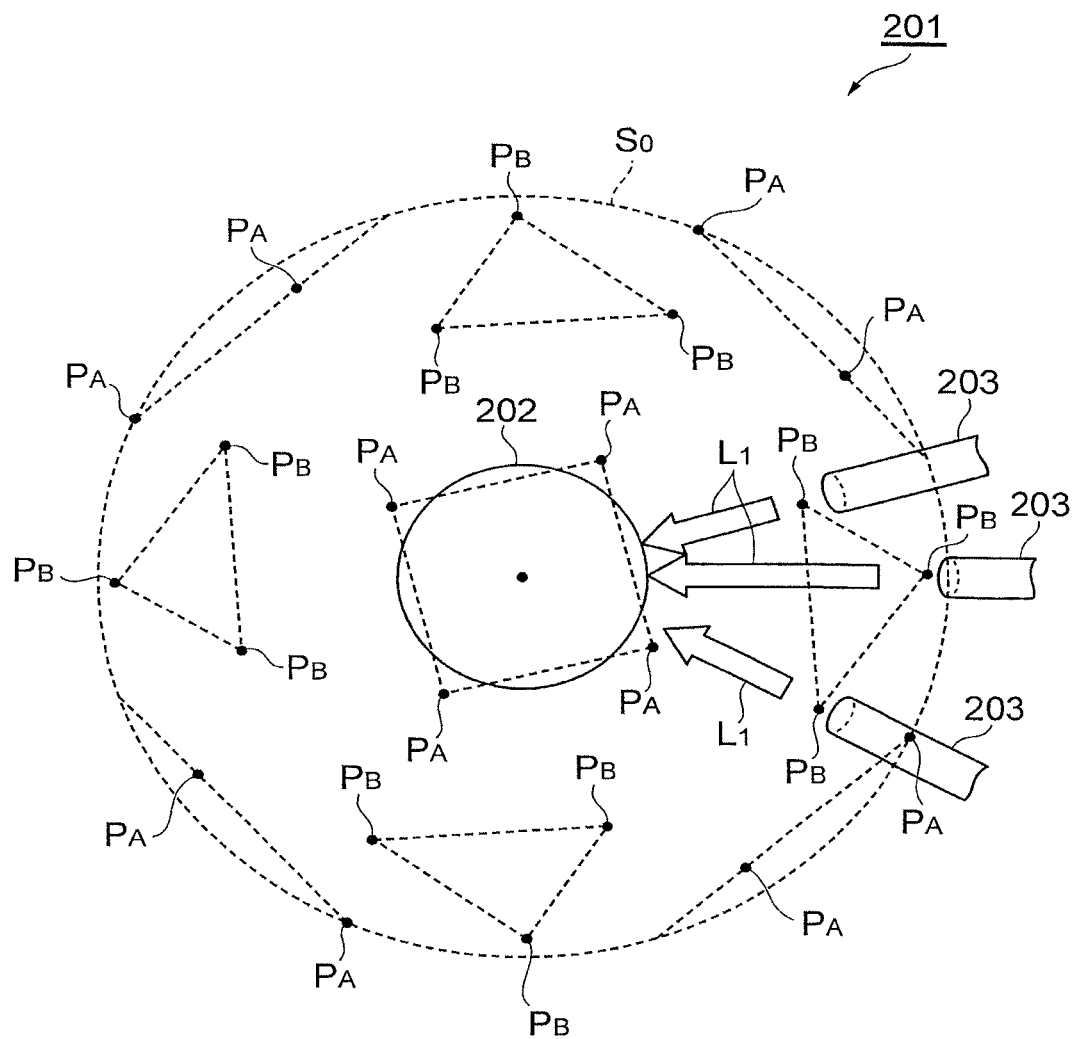
FIG. 5 is a plan view showing a structure of a nuclear fusion device manufactured based on the method of determining irradiation coordinates shown in FIG. 4.
Figure 6:
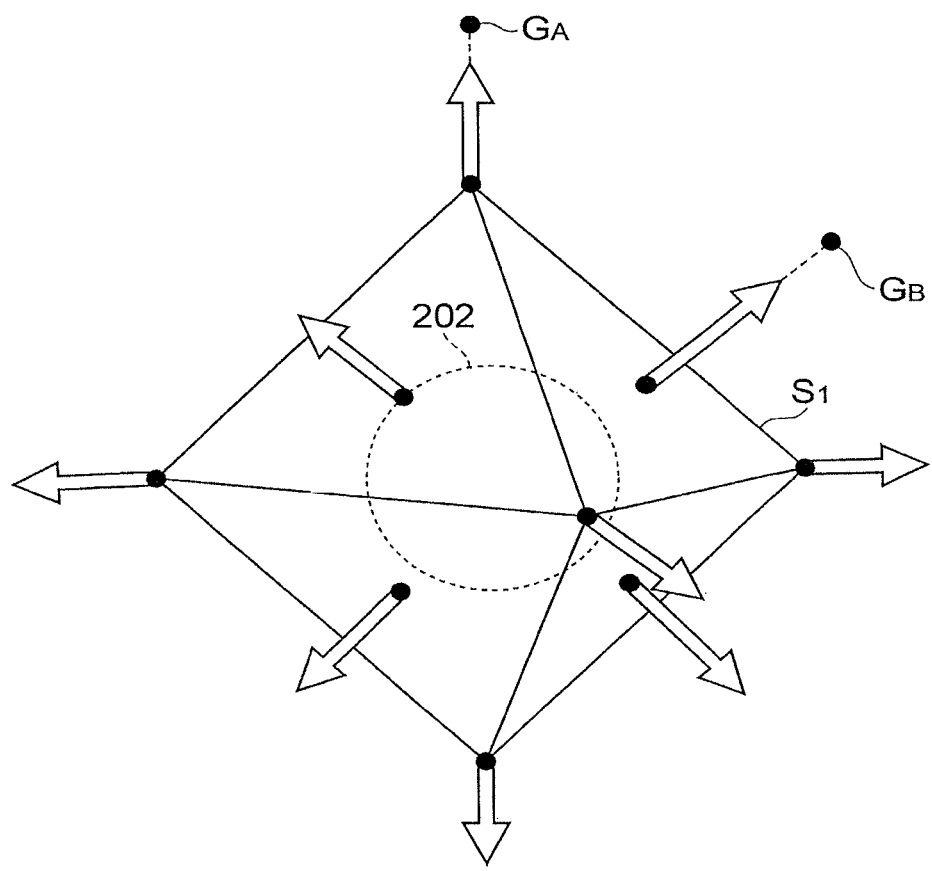
FIG. 6 is a conceptual diagram for describing irradiation coordinates of energy lines in the nuclear fusion device shown in FIG. 5.

The coordinates derived here are represented by the polar coordinates (θ, φ) on the virtual spherical surface $S_0$. FIG. 5 is a plan view showing a structure of a nuclear fusion device 201 manufactured based on the optimal irradiation coordinates in this case, and FIG. 6 is a conceptual diagram for describing irradiation coordinates of energy lines in the nuclear fusion device 201 of FIG. 5.

As shown in FIG. 5, the nuclear fusion device 201 includes a spherical target 202 and laser light irradiation sources 203 that are arranged at 48 points around the spherical target 202 and irradiate laser lights onto the spherical target 202. Here, in FIG. 5, only laser light irradiation sources 203 as a part of the 48 laser light irradiation sources are illustrated. The laser light irradiation sources 203 are provided at positions corresponding to optimal irradiation coordinates on the assumption that the spherical target 202 is positioned at the center of the spherical surface $S_0$.

In detail, the laser light irradiation sources 203 are arranged so as to become capable of irradiating laser lights $L_1$ that advance toward the center of the spherical target 202 by passing through virtual coordinate points $P_A$ and $P_B$ on the spherical surface $S_0$ derived by the device 1 for determining irradiation coordinates. These coordinate points that determine the optimal coordinates of the laser light irradiation sources 203 are divided into two groups of coordinate patterns of 24 coordinate points $P_A$ and $P_B$, and coordinate points $P_A$ corresponding to the pattern A in Table 1 form 6 squares each consisting of four points adjacent to each other, and coordinate points $P_B$ corresponding to the pattern B in Table 1 form eight equilateral triangles each consisting of three points adjacent to each other. As shown in FIG. 6, the laser light irradiation sources 203 are arranged so that the gravity centers $G_B$ of the eight equilateral triangles formed by the coordinate points $P_B$ are positioned on the extensions of the center passing trough the centers of the surfaces of the regular octahedrons $S_1$ centered on the spherical target 202 and the gravity centers $G_A$ of the six squares formed by the coordinate points $P_A$ are positioned on the extensions of the center passing trough the centers of the apexes of the regular octahedrons $S_1$.

Further, in Table 2, the optimal irradiation coordinates of energy lines derived by the device 1 for determining irradiation coordinates when the number of irradiation coordinates $N_B=24$ is set are shown. In a nuclear fusion device to which the number of irradiation coordinates=24 of energy lines is applied, as in the case of the nuclear fusion device 201, laser light irradiation sources are provided at positions corresponding to 24 optimal irradiation coordinates when it is assumed that the spherical target is positioned at the center of the spherical surface $S_0$.

TABLE 2

| θ [°] | φ [°] |
|---|---|
| 86.757 | 357.57 |
| 129.74 | 12.22 |
| 83.162 | 117.35 |
| 96.241 | 281.71 |
| 54.615 | 26.899 |
| 110.6 | 201.4 |
| 114.71 | 321.19 |
| 93.323 | 161.99 |
| 24.335 | 214.95 |
| 155.24 | 303.67 |
| 126.78 | 249.99 |
| 151.41 | 186.75 |
| 65.008 | 198.09 |
| 52.639 | 269.61 |
| 154.45 | 72.262 |
| 28.425 | 333.82 |
| 67.63 | 76.739 |
| 83.213 | 237.8 |
| 50.489 | 146.86 |
| 112.96 | 82.801 |
| 69.087 | 318.31 |
| 26.137 | 87.108 |
| 125.74 | 132.96 |
| 97.304 | 42.137 |

Hereinafter, the optimal irradiation coordinates derived by the device 1 for determining irradiation coordinates shown in Tables 1 and 2 and the optimal irradiation coordinates derived by the device 1 for determining irradiation coordinates when the number of irradiation coordinates $N_B=72$ is set are shown from another viewpoint.

In the case of the number of irradiation coordinates $N_B=24$, the coordinates (θ, φ) obtained by applying the following equations:

$$\theta_{i+4m+8k}=(-1)^m\theta_i+180\ m$$

$$\phi_{i+4m+8k}=(-1)^m\phi_i+95.6162\ m+120\ k$$

i=1, 2, 3, 4; m=0, 1; k=0, 1, 2 to the data shown in the following Table 3, are the optimal irradiation coordinates to be derived by the device 1 for determining irradiation coordinates.

TABLE 3

| i | $N_B = 24$ | | $N_B = 48$ | | $N_B = 72$ | |
|---|---|---|---|---|---|---|
| | $\theta_i$ [°] | $\phi_i$ [°] | $\theta_i$ [°] | $\phi_i$ [°] | $\theta_i$ [°] | $\phi_i$ [°] |
| 1 | 26.24800 | 0.000000 | 21.24302 | 0.000000 | 24.49171 | 84.24238 |
| 2 | 52.56226 | 55.84264 | 43.64296 | 43.69981 | 41.30650 | 48.91327 |
| 3 | 67.23147 | 345.7672 | 51.30717 | 86.62623 | 49.87536 | 87.02248 |
| 4 | 84.37483 | 25.62150 | 69.91959 | 25.70934 | 63.43495 | 62.41641 |
| 5 | | | 72.99624 | 59.45306 | 67.52800 | 35.82484 |
| 6 | | | 83.35323 | 88.40802 | 77.90530 | 83.44693 |
| 7 | | | | | 87.27933 | 56.58353 |

In the case of the number of irradiation coordinates $N_B=48$, the coordinates ($\theta$, $\phi$) obtained by applying the following equations:

$$\theta_{i+6m+12k} = (-1)^m \theta_i + 180\ m$$

$$\phi_{i+6m+12k} = (-1)^m \phi_i + 37.2604\ m + 90\ k$$

i=1, 2, . . . , 6; m=0, 1; k=0, 1, 2, 3 to the data shown in Table 3, are the optimal irradiation coordinates to be derived by the device 1 for determining irradiation coordinates.

Further, in the case of the number of irradiation coordinates $N_B=72$, the coordinates ($\theta$, $\phi$) obtained by applying the following equations:

$$\theta_{i+7m+14k} = (-1)^m \theta_i + 180\ m$$

$$\phi_{i+7m+14k} = (-1)^m \phi_i + 88.8328\ m + 72\ k$$

i=1, 2, . . . , 7; m=0, 1; k=0, 1, 2, 3, 4

($\theta_{71}$, $\phi_{71}$)=(0, 0), ($\theta_{72}$, $\phi_{72}$)=(180, 0)

to the data shown in Table 3, are the optimal irradiation coordinates to be derived by the device 1 for determining irradiation coordinates.

With the above-described method of determining irradiation coordinates and device 1 for determining irradiation coordinates, by the information processing device 30, electric charges $Q_i$ are virtually arranged at the initial coordinates of the number of irradiation coordinates $N_B$ on the spherical surface $S_0$, the coordinates $r_i$ of the electric charges $Q_i$ are analyzed in time series, and based on coordinates $r_i$ at the timing at which the sum $E_P$ of potential energies of the electric charges $Q_i$ was stabilized, irradiation coordinates of energy lines when the nuclear fusion target is arranged at the center of the spherical surface $S_0$ are derived. With a nuclear fusion device manufactured by using this device 1 for determining irradiation coordinates, the uniformity in irradiation intensity of laser lights onto nuclear fusion fuel can be improved with a smaller number of coordinates of laser lights as compared with the conventional case.

Figure 7:
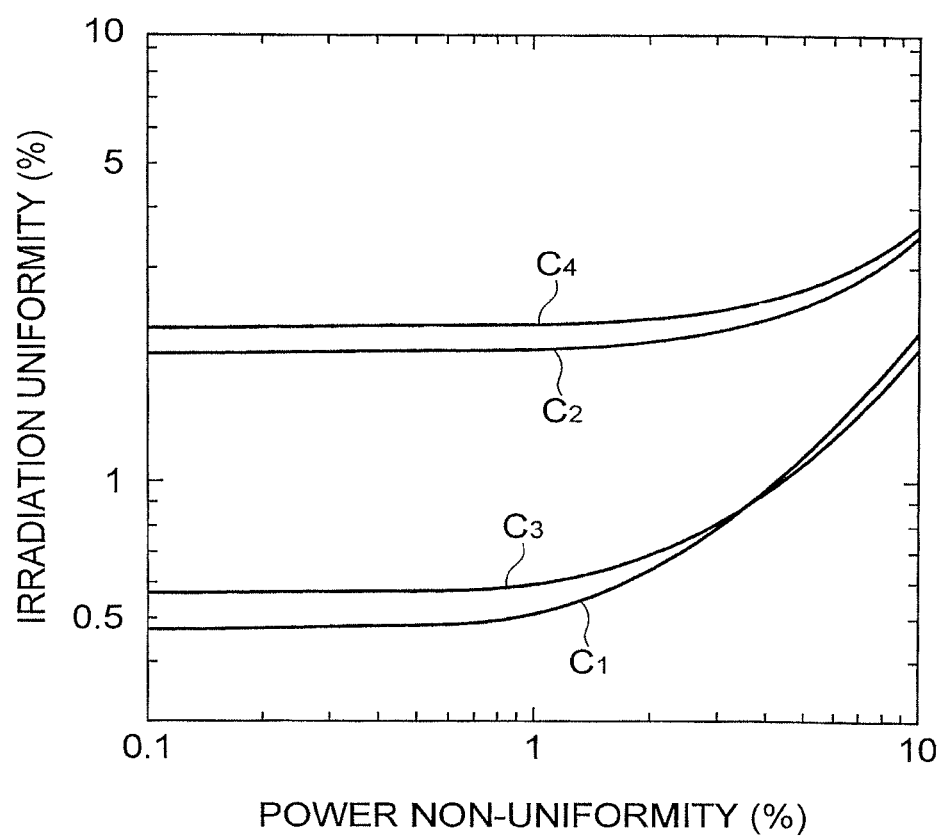
FIG. 7 is a graph showing irradiation uniformity simulation results of the nuclear fusion device according to the present embodiment.

FIG. 7 is a graph showing results of simulation of irradiation uniformity of the nuclear fusion device according to the present embodiment. In this drawing, power non-uniformity on the horizontal axis indicates the degree of intensity difference between laser lights of a plurality of coordinates, and irradiation uniformity on the vertical axis indicates a value obtained by dividing a standard deviation of laser light irradiation intensities on the spherical surface $S_0$ by a mean value thereof. The characteristic $C_1$ shows the case of the number of irradiation coordinates $N_B=48$ in the present embodiment, the characteristic $C_2$ shows the case of the number of irradiation coordinates $N_B=24$ in the present embodiment. On the other hand, the characteristic $C_3$ shows the case of the number of irradiation coordinates equals 60 in a conventional device (OMEGA 60, University of Rochester-Laboratory for Laser Energetics), and the characteristic $C_4$ shows the case of the number of irradiation coordinates equals 24 in a conventional device (OMEGA 24, University of Rochester-Laboratory for Laser Energetics). From these results, it is understood that, in the present embodiment, the irradiation uniformity is improved with irradiation coordinates the number of which is the same as or smaller than in the conventional case.

It was further confirmed that no laser beams were opposing each other with respect to the center of the spherical surface $S_0$ when the number of irradiation coordinates $N_B$ was larger than 20 in the case of irradiation coordinates of laser lights obtained by the method of determining irradiation coordinates and the device 1 for determining irradiation coordinates according to the present embodiment. Therefore, deterioration in performance due to damage caused by opposing laser light sources can be avoided.

Further, in the present embodiment, it is determined whether a temporal change of the sum $E_P$ of potential energies of the electric charges $Q_i$ is not more than the threshold $Th_P$, so that irradiation coordinates with improved laser light irradiation uniformity can be efficiently derived within limited ranges of operation performance and operation time.

With a nuclear fusion device manufactured by using the method of determining irradiation coordinates and the device 1 for determining irradiation coordinates, uniformity in irradiation intensity of energy lines onto a nuclear fusion target is improved, so that inertial confinement fusion can be stably caused.

Here, preferably, it is determined in the potential evaluation step whether a temporal change of the sum of potential energies of a predetermined number of electric charges at the timing is not more than a predetermined value, or the potential evaluation means determines whether a temporal change of the sum of potential energies of the predetermined number of electric charges at the timing is not more than a predetermined value. In this case, irradiation coordinates with improved energy line irradiation uniformity can be efficiently derived.

INDUSTRIAL APPLICABILITY

The present invention is applied to a method of determining nuclear fusion irradiation coordinates and a device for determining nuclear fusion irradiation coordinates that determine irradiation coordinates of energy lines onto nuclear fusion fuel, and a nuclear fusion device manufactured by using these method and device, and can efficiently improve uniformity of energy lines to be irradiated.

REFERENCE SIGNS LIST

1: Device for determining irradiation coordinates, 30: Information processing device, 102: Initial arrangement section (initial arrangement means), 103: Coordinate analysis section (coordinate analysis means), 104: Potential evaluation section (potential evaluation means), 105: Optimal coordinate determination section (irradiation coordinate deriving means), 201: Nuclear fusion device, 202: Spherical target (nuclear fusion target), 203: Laser light irradiation source (energy line source), $S_0$: Spherical surface

The invention claimed is:

1. A method of determining nuclear fusion irradiation coordinates for calculating irradiation coordinates of energy lines when the energy lines are irradiated onto nuclear fusion fuel, comprising:

virtually arranging a predetermined number of electric charges at a predetermined number of initial coordinates on a spherical surface set by using random numbers by an information processing device;

analyzing coordinates of the predetermined number of electric charges arranged at the initial coordinates in time series based on coulomb forces acting among the predetermined number of electric charges by constraining the coordinates onto the spherical surface by the information processing device;

determining a timing at which potential energies of the predetermined number of electric charges were stabilized based on the coordinates analyzed in the coordinate analysis step by the information processing device;

deriving coordinates of the predetermined number of electric charges at the timing determined in the potential evaluation step as irradiation coordinates of the energy lines in a case where nuclear fusion fuel is arranged at the center of the spherical surface by the information processing device; and arranging a predetermined number of energy line sources at positions within a nuclear fusion device corresponding to the irradiation coordinates when the nuclear fusion fuel is arranged at the center of the spherical surface.

2. The method of determining nuclear fusion irradiation coordinates according to claim 1, wherein in the step of determining the timing at which potential energies of the predetermined number of electric charges were stabilized, it is determined whether or not a temporal change of the sum of potential energies of the predetermined number of electric charges at the timing is not more than a predetermined value.

* * * * *